E. C. SHAW.
VEHICLE WHEEL RIM.
APPLICATION FILED MAY 27, 1907.
1,009,445.
Patented Nov. 21, 1911.
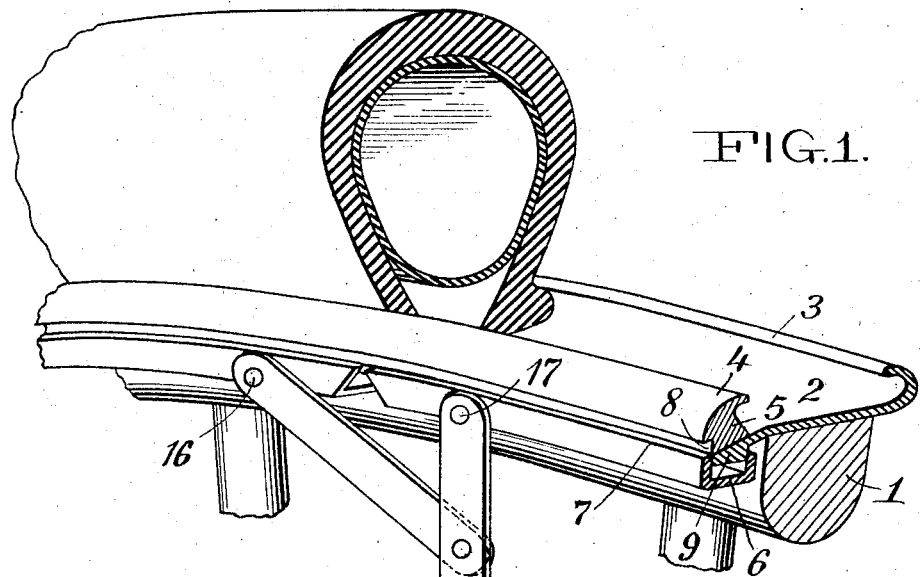
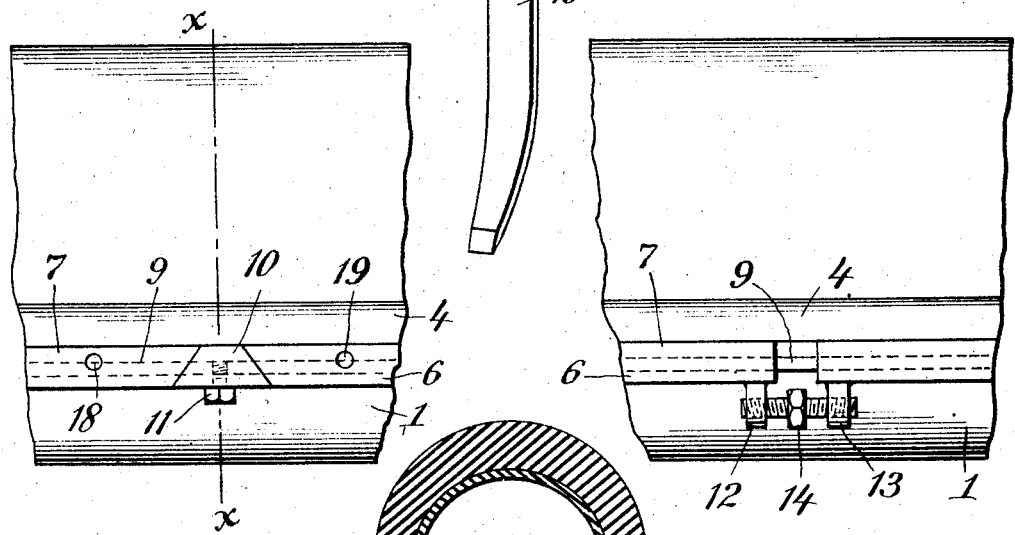
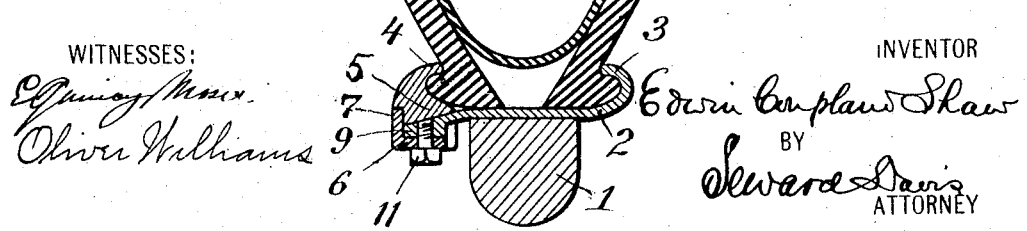
WITNESSES:
INVENTOR
Edwin Canplaw Shaw
BY
Seward Davis
ATTORNEY

UNITED STATES PATENT OFFICE.

EDWIN COUPLAND SHAW, OF AKRON, OHIO, ASSIGNOR, BY MESNE ASSIGNMENTS, TO THE UNITED RIM COMPANY, OF AKRON, OHIO, A CORPORATION OF OHIO.

VEHICLE WHEEL-RIM.

1,009,445.  Specification of Letters Patent. Patented Nov. 21, 1911.

Application filed May 27, 1907. Serial No. 375,984.

*To all whom it may concern:*

Be it known that I, EDWIN COUPLAND SHAW, a citizen of the United States, and a resident of the city of Akron, county of Summit, and State of Ohio, have invented certain new and useful Improvements in Vehicle Wheel-Rims, of which the following is a specification, reference being had to the accompanying drawings, which form a part thereof.

My invention relates to that class of vehicle wheel rims adapted for use with tires of resilient materials, and more particularly to rims intended for use with tires which can be applied and detached at will. This form of rim consists of three members: an annular rim adapted to be secured to the wheel felly, a removable tire retaining flange formed upon an endless ring, and a removable retaining ring adapted, when in position, to secure the endless ring against laterally outward movement. The form of retaining means herein described and claimed consists of a transversely split ring adapted to seat within or beneath the extended edge of the main portion of the rim and provided with an upwardly or radially outward extending flange adapted to rise above the edge of the said main portion when the retaining ring is in the locked position. In my preferred construction the retaining ring normally tends to expand its diameter, means being provided for contracting the said ring in order to insert it in its operative position.

The object of my invention is to provide a rim sufficiently strong to bear the violent strains to which such structures are subject, which will at the same time have a detachable tire retaining flange to permit the use of non-extensible or non-stretchable tires and to facilitate the attachment or removal of tires of any form.

Referring to the drawings, Figure 1 is a perspective view of a tire, rim and felly embodying my improvements, showing the general construction thereof. Fig. 2 is a side elevation of the structure, showing the retaining means locked in the operative position. Fig. 3 is a cross section taken along the line X X of Fig. 2, showing details of construction. Fig. 4 is a side elevation of a structure embodying the modified form of my invention, the modification consisting of the means for contracting the retaining ring and for locking it in the operative position.

Throughout the drawings like reference numerals refer to like parts.

In Figs. 1, 2 and 3, 1 is the wheel felly upon which is seated the annular rim 2, adapted to be secured thereon by means of riveting or the like. Along one edge of the rim 2 is a tire retaining flange 3, extending about the entire periphery. This flange may obviously be of various shapes for use with various forms of tires, although in the drawings I have shown it of the form which is used with clencher tires, being outwardly, upwardly and inwardly turned to grasp and hold beads formed upon the tire casing. The other lateral edge of the rim 2 is left flat or inclined slightly downward, and is adapted to form a seat for a removable tire retaining flange 4, which corresponds in shape to the tire retaining flange 3, but is oppositely disposed. The tire flange 4 is mounted upon an endless ring 5, which is shaped to fit accurately upon the portion of the rim designed to receive it. If, as suggested, this edge of the rim is inclined downward, the base portion of the said ring must be beveled correspondingly. This endless ring is entirely separate from the rim, and means are provided for retaining it thereon, permitting the endless ring to be easily applied or removed. These means consist, preferably, of a transversely split retaining ring 6 suitably proportioned to fit within or beneath the edge of the rim which bears the removable tire retaining flange. This split ring is preferably of metal, must be slightly elastic and preferably has a diameter normally greater than that which it has when in the operative position. Along one edge of this ring 6 I provide an upwardly extending flange 7 of such size that when the split ring is in the operative position the flange projects slightly above the adjacent portion of the rim, and thus serves to retain in position the endless ring which bears the tire retaining flange. Along the outer and lower edges of the ring 5 I prefer to provide a recess 8, shaped to admit the flange 7, so that when the two are in the operative position their outer faces are flush. To secure a firm seat for the split ring, the under-surface of the rim against which it seats may be provided with an annular ridge 9, in which case the split ring must be grooved to correspond.

Although the normal expanding tendency of the ring 6 is sufficient to retain it in place, I prefer to provide at the point where it is split some means for locking it in the operative position. This may be done in a variety of ways: for example, in Figs. 1, 2 and 3, the ring terminals are shown as beveled in opposite directions, thus forming a wedge-shaped opening. A wedge 10 is provided having a cross section similar to that of the split ring, and its other dimensions such that when the split ring is in the operative position the wedge fits accurately into the opening and forms a portion of the retaining flange at that point. Through the bottom of this wedge extends a bolt 11, threaded to correspond with a tapped socket in the rim at that point. In Fig. 4 I have shown a modification of this locking means in which two downwardly projecting studs 12 and 13 are formed upon the split ring near its terminals, and through holes provided in the said studs, and properly threaded, a turn-buckle 14 is inserted. The rotation of this turn-buckle in one direction expands the ring or if the ring normally tends to enlarge permits it to expand, and in the other direction contracts it.

The operation of my device is as follows: To attach a tire the split retaining ring and the endless tire retaining flange are removed and the tire applied to the rim, so that it engages closely with the tire flange 3. The removable tire flange is thereupon slipped into place about the rim, which can be easily done as, of course, the tire is wholly or partly deflated. The split retaining ring is then contracted sufficiently to enable it to be sprung into place beneath the rim, its groove engaging with the ridge 9. The normal tendency of the split ring thereupon expands it into the operative position, whereupon the wedge 10 is inserted and the bolt 11 screwed solidly up into place. If the expansive tendency of the split ring does not force it entirely into place the insertion of the wedge will do so.

In all ordinary structures the split ring can be sprung into place by hand, but in heavy structures the stiffness of the ring may be too great to permit this, in which case I provide some suitable operating tool such as the jointed lever 15. Pins 16 and 17 at the extremities of the lever arms are inserted in suitably located sockets 18 and 19 in the split ring near the terminals, whereupon pressure exerted upon the long arm of the lever will enable the ring to be contracted and thus sprung into position.

The operation of the form shown in Fig. 4 is very similar, except that when applying or removing the split ring the turn-buckle is used to contract, expand, or permit expansion, no tool being necessary.

It is obvious that my device may be applied to both tire flanges by a mere duplication of parts, or that the flange 3 may also be mounted upon an endless ring secured upon the rim by an upturned flange integral with the rim edge. In this manner the removal of the single retaining ring will permit both endless rings to be detached, and, if desired, replaced by others.

While setting forth one modification of my invention in detail, it is not to be understood that I intend to limit myself to this exact construction; but I have chosen it merely as an illustration of one of the many forms which my invention may take. For example, I do not wish to limit myself to a locking ring having a tendency to expand to a diameter greater than that of its seat as the only essential characteristic of the ring is that it possess sufficient flexibility to permit it to be contracted to be removed and expanded to engage its seat.

Having described my invention what I claim is:

1. In a vehicle wheel rim, in combination, a tire seating member, a removable tire retaining flange, and means for locking said removable tire retaining flange to said tire seating member consisting of a transversely split ring adapted to seat within the edge of the tire seating member and interlocking therewith, and having a portion projecting laterally beyond the edge of the tire seating member and radially beyond the inner circumference of the tire retaining flange.

2. In combination, a vehicle wheel rim, a removable tire retaining flange therefor, and means for locking said removable tire retaining flange to said vehicle wheel rim consisting of a transversely split ring formed to provide an annular groove in its upper surface, a correspondingly shaped ridge upon the under surface of that portion of the said rim which bears the removable tire retaining flange, a retaining flange formed by a wall of the groove in said split ring and adapted to extend above the edge of the said rim when in the operative position, said ring having a normal tendency to expand in diameter.

3. In combination a rim, a removable flange therefor and means for locking said removable flange to said rim comprising a transversely split ring adapted to seat within the rim and having means to prevent lateral motion and a wedge adapted to enter the opening between the terminals of said split ring when in operative position.

4. The combination with a wheel rim of an endless removable tire retaining flange adapted to seat upon one edge of said rim, a cross split retaining ring adapted to seat within the rim and having a diameter normally greater than that of its seat and having means to prevent lateral motion, an upwardly extending flange upon said split ring adapted when the ring is in the operative position to extend above the edge of said rim, and to secure the removable tire retaining flange thereon, a wedge adapted to enter the opening between the terminals of said split ring when in the operative position, and means for securing said wedge in said opening.

5. In a vehicle wheel rim, the combination of a tire seating member, a tire retaining flange mounted upon an endless removable ring adapted to seat upon said member, and a removable split ring adapted to seat beneath said member, said ring being provided with means to prevent lateral motion and with a flange adapted to project upward outside of the edge of said member, to engage said endless ring and to retain it on said member.

6. In a vehicle wheel rim the combination of a tire seating member, an endless removable tire retaining flange, a transversely split U-shaped retaining ring, a seat for said retaining ring within said member, one leg of said retaining ring engaging said member and the other said flange and means for locking said retaining ring against its seat.

7. In combination, a rim, a removable tire retaining flange, a ridge on the under-surface of the rim, a split locking ring channeled to receive said ridge, and having an upstanding projection to engage said tire retaining flange, and means for securing the ends of said locking ring to the rim.

8. In combination, a rim, a removable tire retaining flange, a ridge on the under-surface of the rim, a split locking ring channeled to receive said ridge and having an upstanding flange to engage said tire retaining flange, a member engaging both ends of the locking ring and means for securing the member to the rim.

9. In a vehicle wheel, the combination with a main rim member and a removable side flange, said main rim member having a bead or rib extending toward the center of the wheel, of an expanded locking ring engaging said bead or rib and having means to prevent lateral motion and also engaging said removable flange.

10. In a vehicle wheel, the combination with a main rim member and a removable side flange, said main rim member having a bead or rib extending toward the center of the wheel, of an expanded channeled locking ring engaging said rib or bead and said removable flange.

11. The combination with the rim having a projection or flange extending radially inward from the rim, and having an outer surface, over which the tire can be slipped, of the tire-retaining flange or ring adapted to be fitted to the said surface and to be slipped thereon in to points beyond the outer edge of the rim, and the locking ring normally expanding outward toward the under side of the rim and having a projection or flange inside of the projection or flange on the rim, and having a projection outside of the said edge of the rim and extending out to points beyond the said outer surface.

12. The combination with the rim having the outer surface over which the tire can be slipped, a removable tire-retaining flange or ring carried by the rim, and the elastic locking ring normally tending when in position, to expand radially outward toward the under side of the rim, said ring having means to prevent lateral motion, and having a projection which extends out to and engages with the tire-retaining flange or ring fitted as aforesaid to the rim.

13. The combination with the rim having the tread part with an outer surface over which the tire can be slipped, the tire-retaining ring or flange fitted to the said surface, and the elastic locking ring arranged to normally expand outwardly toward the under surface of the rim, said ring having means to prevent lateral motion, and having a projection outside of the side edge of the rim and extending outward to points beyond the surface, and outside of a part of the tire-retaining flange or ring.

14. In a vehicle wheel, the combination with a main rim member having a beveled seating surface and a removable side flange having a shoulder adapted for engagement with said beveled seating surface, of an expanding locking ring for securing the side flange in position.

15. In a vehicle wheel, the combination with a main rim member and a removable side flange, said main rim member having a bead or rib extending toward the center of the wheel, of a locking member having a channel adapted to receive said bead or rib and a portion of said removable side flange to hold said side flange in position.

16. In a vehicle wheel, the combination with a main rim member having a rib or bead on its wheel face and a removable side flange, of a locking member having a channel adapted to receive said rib or bead and a portion of said removable side flange to hold the removable side flange in position, and a block for retaining said locking member in place.

EDWIN COUPLAND SHAW.

Witnesses:
CHARLES GOSS GOODRICH,
WALTER KEADY MEANS.

Copies of this patent may be obtained for five cents each, by addressing the "Commissioner of Patents, Washington, D. C."